United States Patent [19]
Zucker

[11] 3,988,329
[45] Oct. 26, 1976

[54] PROCESS FOR CONTINUOUS CATALYTIC HYDROGENATION

[75] Inventor: Friedrich J. Zucker, Norf, Germany

[73] Assignee: Hans Heinrich Auer, Rodenkirchen, Germany

[22] Filed: Dec. 18, 1974

[21] Appl. No.: 533,886

[30] Foreign Application Priority Data
Dec. 21, 1973 Germany............................ 2363886

[52] U.S. Cl.............................. 260/409; 260/690; 260/677 H; 23/288 E; 23/288 R; 23/285
[51] Int. Cl.²...................... C11C 3/12; C07B 1/00; B01J 8/00
[58] Field of Search............... 260/409, 690, 677 H; 23/288 E, 288 R, 285

[56] References Cited
UNITED STATES PATENTS

| | | | |
|---|---|---|---|
| 1,095,144 | 4/1914 | Ellis | 260/409 |
| 1,678,778 | 7/1928 | Harter | 23/288 E |
| 2,383,189 | 8/1945 | Hancock | 23/288 E |
| 2,474,592 | 6/1949 | Palmer | 23/288 E |
| 2,717,202 | 9/1955 | Bailey | 260/409 |
| 2,909,634 | 10/1959 | Stratford | 23/288 E |
| 2,932,658 | 4/1960 | Thompson | 260/409 |
| 3,356,461 | 12/1967 | Lynch et al. | 23/285 |
| 3,505,029 | 4/1970 | Polgar et al. | 260/409 |

*Primary Examiner*—Patrick P. Garvin
*Assistant Examiner*—John F. Niebling
*Attorney, Agent, or Firm*—Diller, Brown, Ramik & Wight

[57] ABSTRACT

A process for the continuous catalytic hydrogenation of materials in a flowable form are described. In the process the material to be hydrogenated and a hydrogenating agent in the presence of a hydrogenation catalyst are subjected to shearing forces and a rapid succession of compressions and expansions. Preferably, the shearing forces and rapid succession of compressions and expansions are provided by means of a row of teeth in the reaction zone which move at a small spacing from one another. The process provides a higher reaction rate for a select catalyst and, additionally, permits the continuous use of the catalyst without detrimental affects.

9 Claims, 4 Drawing Figures

PROCESS FOR CONTINUOUS CATALYTIC HYDROGENATION

FIELD OF INVENTION AND BACKGROUND

The invention relates to a process for the continuous catalytic hydrogenation of materials which can be hydrogenated in a flowable form, i.e., materials which are liquid or in a paste-like form. Preferably the process is carried out at elevated temperature and under pressure.

The basic chemistry and technology of hydrogenation processes are well-known. Suitable materials and apparatus are available for hydrogenation, and an extraordinarily large number of catalysts and catalyst systems are known directed to particular hydrogenation reactions. One disadvantage of prior art hydrogenation processes and of prior art hydrogenation catalysts is that the catalysts which are most effective for use are generally also the most costly catalysts. For example, the elements from Group VIII of the Mendeleev periodic table, i.e., platinum, palladium, iridium, etc., are excellent catalysts, but they are also extremely expensive. Platinum is particularly advantageous in hydrogenation reactions since it usually proceeds more quickly and/or at lower temperatures with respect to other catalysts. Nevertheless, in general practice platinum is not used due to its high cost. Instead, a less active but less costly catalyst is selected which is a compromise between hydrogenation activity and economy of catalyst. A known area of endeavor, therefore, is the finding of a process which achieves an increase in hydrogenation efficiency with a given catalyst or catalyst system.

OBJECTIVE AND DESCRIPTION OF INVENTION

A primary objective of this invention, therefore, is in finding a process which makes it possible to operate with a less active catalyst or catalyst system while maintaining a prescribed hydrogenation efficiency.

According to the present invention, the speed of catalytic hydrogenation reactions can be substantially improved by forming a mixture of the material to be hydrogenated and hydrogen, and at times or optionally, other substances, such as diluents for the material to be hydrogenated and/or for the hydrogen gas, and subjecting the mixture in the presence of a hydrogenation catalyst to a rapid succession of compressions and decompressions, and simultaneously therewith, to the action of high shearing forces.

More specifically, according to the invention a process is provided for the continuous catalytic hydrogenation of materials capable of being hydrogenated and which exist in a flowable form, preferably at elevated temperature and under pressure, characterized in that the material to be hydrogenated, optionally together with solvents and/or suspension agents, is conducted together with a hydrogen-containing gas continuously through a substantially axially symmetrical reaction zone, in which the mixture is subjected to shearing forces in the presence of a hydrogenation catalyst and, in a rapid sequence, is subjected to compressions and expansions by means of circular and coaxially interengaging rows of teeth which are moved with a small spacing from one another.

The process is suitable for continuously carrying out both heterogeneously catalyzed and homogeneously catalyzed hydrogenation reactions. The process is of particular significance with respect to carrying out the heterogeneously catalyzed hydrogenation procedures. One particular difficulty in connection with the carrying out of heterogeneously catalyzed hydrogenation reactions is in that the catalysts which are present in solid form quickly lose their activity during continuous operation. This is largely due to a superficial deposition thereon of resinous reaction products, known in technical jargon as "gumming up" or "gumming." Such a deleterious effect on heterogeneous catalysts and catalyst systems is avoided by the process of the present invention. Because compression is immediately followed by decompression of the reaction charge, any impurities of higher molecular weight which are formed are stripped off the solid catalyst. Therefore, the surface remains bright and highly active.

The primary effect which is achieved according to the present invention is that, i.e., with the guiding or conduction of the reactants through the coaxially arranged rows of teeth which are moved opposite to one another, the system is exposed in quick succession to extremely high pressures and comparatively to extraordinarily low pressures. By means of the process of the invention, it is possible, within the reaction system of the catalytic hydrogenation, to produce extremely high pressures locally in installations which are not per se designed for such pressures. Zones of extremely high pressure—wave peaks—and zones of low pressure—wave troughs — are propagated on a circular path, almost as a wave. The pressure loading to be borne by the housing of the apparatus used for carrying out the process does not need to correspond approximately to the maximum pressure reached in the compression, but to a very much lower value. Nevertheless, the extremely high pressures which are reached are available for the pressure hydrogenation in the system. It is, therefore, possible to produce a pressure hydrogenation, even without using external pressure. By the succession of high-pressure and low-pressure zones, it is now not only the adsorption of the compound to be hydrogenated and also of the hydrogen on the catalyst which is promoted, but rather also the subsequent desorption of the products.

The design of the apparatus for achieving the succession of high and low pressures is not critical per se, and includes the separate rows of teeth noted above, as well as a continuous apertured ring, as long as circular, coaxially inter-engaging, broken rings of material are present which permit a passage of the reaction material.

The process is suitable for the catalytic hydrogenation of any desired materials, but these are to be introduced in a flowable phase. Accordingly, the materials used are liquid at the reaction temperatures, or are introduced in a solvent or suspension agent. Inert substances are to be considered as solvents or suspension agents in connection with hydrogenation operations. Water is suitable with many reactions, while with others a mediumly saturated hydrocarbon fraction is desirable, depending on the nature of the hydrogenation reaction which is chosen. However, solvents or suspension agents are frequently suitable which themselves undergo hydrogenation under the reaction conditions. The known carbon hydrogenation sump phase is an example of this. Consequently the materials being used and which are per se solid are saturated with an oil which can itself be hydrogenated. The actual materials which can be used extend from the typical materials for carbon or oil hydrogenation to the hydrogenation of edible fats and oils. In connection with the technical carbon or oil hydrogenation, the process is suitable for the sump phase hydrogenation, but also for the hydrogenation of materials which per se are already completely liquefied.

The reaction temperatures and pressures to be used depend on the nature of the hydrogenation which is carried out. Depending on the material being employed, the temperature may be within the range of from approximately 0° and 500° C. With hydrogenation reactions carried out on typical materials in the mineral oil industry, the temperature is from about 200° and 450° C. The hydrogenation of edible oils and fats takes place at lower temperatures, for example, in the range of from about 100° and 200° C.

The reaction pressures lie between approximately normal (atmospheric) pressure and up to about 500 atm, once again depending on the reaction system, that is to say, on the material being used and the catalyst which is employed. The pressures which are necessary for the hydrogenation are lower than those with the hydrogenation of corresponding reaction systems with conventional processes. With the hydrogenation of edible oils or fats, they are usually between atmospheric pressure and approximately 20 atm.

The process is advantageously carried out by means of an apparatus which consists of a housing having a frusto-conical rotor revolving therein, the wall surface of said rotor being fitted with coaxial rings of teeth of stepped diameter, which are respectively staggered with identical rings on the inside wall of the housing opposite the rotor. Such arrangements are known per se; they are referred to generally as centrifugal or gyro apparatus. The number of the rings is about three to five, both on the rotor and also on the facing inside wall. The individual ring usually comprises about 50 to about 1,500 teeth, i.e., a continuous ring contains about 50 to 1,500 holes. The speed of rotation of the rotor must be sufficient to cause substantial compression and expansion of the material which is guided through the apparatus, but not perhaps a simple displacement. The speed of rotation is advantageously in the range in which cavitation phenomena occur. The speed of rotation is usually at about 500 to 7,000 rpm.

The hydrogenation catalyst can be premixed with the material being introduced or it can be supplied separately from the latter and introduced through a separate supply point into the reaction zone, in order then to be conveyed together with the material through the reaction zone. In the simplest case, therefore, the said material is used as a solvent or suspension agent for the catalyst.

In one particular development of the invention, however, the inside of the apparatus used for the hydrogenation is itself at least partially developed as a catalyst system. In such constructional form of the invention, the surfaces of the rows of teeth or of the separate teeth consist at least partially of a solid material which catalyzes hydrogenation reactions. In this respect, the teeth can be made of the same catalytically acting material. It is not necessary, however, for all teeth to be covered with the same catalytically acting material or to be made of the same catalytically acting material. Rather it is possible for separate teeth or rows of teeth to be made of a material which is not catalytically active. It is also possible for different types of catalytically acting materials to be used. Individual teeth can be covered or made from one catalytically active material, while other teeth are covered or made of another catalytically active material. By comparison with conventional fixedly arranged catalysts, the constructional form of the invention as previously described presents the same advantages as those which have been generally mentioned above for heterogeneous catalysts. There is no deleterious effect on the surfaces.

The two methods of introducing the catalyst into the reaction zone (introduction from outside and simultaneous conduction; catalytically acting rows of teeth) can, if desired, be combined with one another. Therefore, also when using rows of teeth which are at least in part made of catalytic material and/or which have at least on the surface a catalytically active material, another catalyst (heterogeneously or homogeneously) can be conducted through the reaction zone, together with the material which is to be hydrogenated.

With the supply of the materials to be treated, catalyst and hydrogen-containing gas, it is usually expedient, but not necessary, for the supply to take place in a strictly axial direction. The guiding of the reaction mixture is in fact effected outwardly from inside, but it is not essential for the reactants to be supplied axially, provided that it is assured that they are jointly guided outwardly from inside through the reaction zone. A non-axial supply can, for example, be made possible by means of one or more supply pipes through the housing wall facing the rotor.

Depending on the required degree of hydrogenation of the product, it may be expedient for a part of the mixture discharging from the reaction zone to be fed back cyclically into the reaction zone. By this procedure, the effective residence time of the reaction mixture in the apparatus used for carrying out the process is correspondingly lengthened.

A large number of catalysts can be used for the process according to the invention — all hydrogenation catalysts being useful. Which catalyst is used in an individual case depends on the hydrogenation reaction which is carried out. It is, therefore, possible to carry out the reaction with the catalysts conventionally employed in the respective reactions. The oxides and sulphides of molybdenum and tungsten, possibly with the simultaneous use of hydrohalides, are examples particularly suitable for carbohydrogenation. Also to be considered are iron oxide compositions, which contain iron oxide as an essential component, but in addition the oxides of other elements such as magnesium, calcium, titanium, manganese, silicon, aluminium, as well as the alkali metals can be used. Tin oxalate has also been used. Nickel, iron, cobalt, and particularly chromium, tungsten and molybdenum may generally be suitable.

With the use of most of the aforementioned catalysts, a recovery step is generally unnecessary. The sludge is separated from the hydrogenation product which is obtained and is discarded, possibly after another separation operation, during which other usable reaction products are separated out. Costly catalyst materials can, however, be separated in known manner from the hydrogenation product and used again, particularly in the case where materials are used which are in a liquid phase of comparatively low viscosity.

As catalysts which can be used for the production of teeth or rows of teeth with a catalytically active surface, there are, for example, to be considered the so-called hydrogenation or Group VIII metals, i.e., more particularly platinum, palladium, rhodium, iridium, ruthenium, and osmium, and also their alloys. These catalysts can be applied in a simple manner, for example, by vapor-coating (wire explosion, etc.), galvanically, or by plating. However, all the catalysts which are used as stationary catalysts and have sufficient mechanical strength are also suitable. The oxidic or sulphidic catalysts and mixed catalysts which have already been mentioned are also suitable. The actual catalysts can also be present in a holding means capable of withstanding relatively strong stresses and form separate teeth or all teeth together with the said holding means, which can, for example, be made of steel.

One particular development of the cyclic return of material discharging from the reaction zone provides for a separation of the discharging material into components of different physical or chemical nature, so that the material returned into the process is distinguished from the material drawn off as product.

The separation can, for example, be effected in known manner into constituents of different volatility. In this way, there is constantly drawn off a product of prescribed boiling point or boiling range, while the material of a higher boiling point is continuously returned in a cycle into the process.

The hydrogenation agent or hydrogen-containing gas can be hydrogen itself, or hydrogen in admixture with a gas, such as nitrogen, which is inert in the reaction and which has no disadvantageous influence of the hydrogenation. Depending on the hydrogenation reaction, steam or another gas can, for example, be present as the gas which is inert with respect to the reaction, which gas positively must not comply with the definition of an inert gas in its other chemical reactions.

The nature of the invention will be further understood by reference to the following description together with several views illustrated in the accompanying drawing of a preferred and suitable apparatus for carrying out the disclosed method.

IN THE DRAWING

Figure 1:
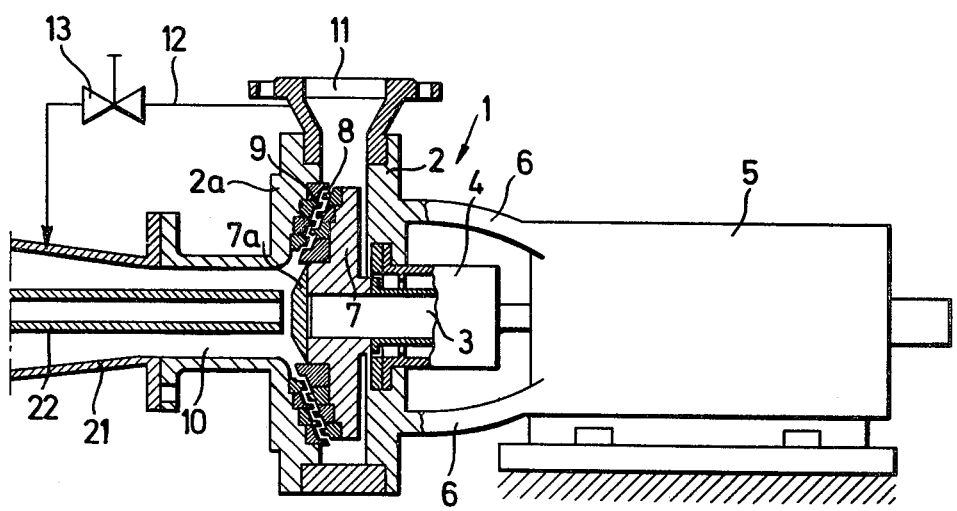
FIG. 1 is a diagrammatic view illustrating an apparatus effective for carrying out this invention, and particularly shows a rotating rotor and a stationary stator defining therebetween a reaction zone through which the material to be hydrogenated is alternately subject to compression and expansion.

The illustrated apparatus is generally designated by the reference numeral 1 and includes a housing 2 joined by arms 6 to a housing 5 containing a motor (unnumbered) having a shaft 3 keyed to a rotor 7. The shaft 3 is mounted in suitable conventional bearings 4 and the rotor 7 carried thereby in turn carries a plurality of rings 8 (FIG. 1) or 17 (FIG. 2). The rotor opposes a plurality of rings 9 defining a stator carried by a housing portion 2a and between the rings 8 and 17 and the rings 9 is a reaction area of an undulating configuration which imparts sequential compression and decompression of reactive materials as the material passes from an inlet 10 therethrough toward and through an outlet 11. If desired, a bypass pipe or conduit 12 provided with a valve 13 may be used to selectively recirculate the material from the outlet back to the inlet 10 and through the reaction area between the stator 9 and the rotor 8 to increase the through-time of the material through the reaction area.

The rings 8 of the rotor 7 are in circular concentric relationship and each ring includes a land (unnumbered) projecting toward the stator 9 with a valley (unnumbered) between adjacent lands. In an alternative construction (FIG. 2) the rings 8 are replaced by the rings 17 and catalytic material 16 which is in compressed form is housed within pockets 15 of wire, perforated metal, or like material which in turn is secured to each ring 17 by strips on brackets 15a which completely surround the pockets 15 at the free terminal or base portions (unnumbered) thereof.

Figures 2, 3:
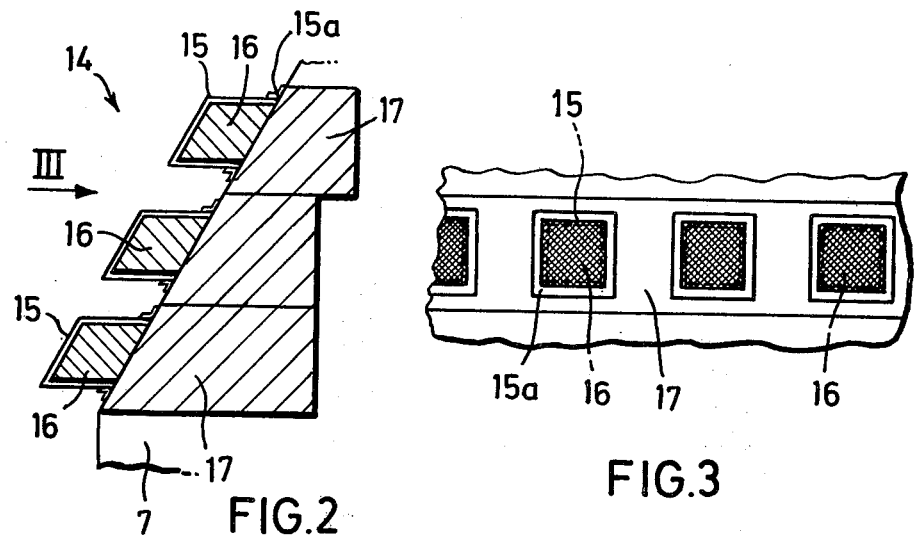
FIG. 2 is a diagrammatic view of a portion of the rotor, and illustrates details of lands and valleys thereof with the lands being in the form of teeth formed from compressed catalytic material.
FIG. 3 is a fragmentary plan view looking in the direction of the headed arrow III of FIG. 2, and illustrates the manner in which compressed catalytic material is retained in position upon the rotor by meshed wire pockets.

In the apparatus shown in FIG. 1 the rings 8 may be totally constructed of catalytic material or the lands only thereof may be constructed of catalytic material or as an alternative the lands may simply be provided with a coating of catalytic material. In the latter case the catalytically acting material may be applied by plating, spraying, or the like. However, in the embodiment of the invention illustrated in FIG. 2 it is assumed that the catalytically active material exists in such a phase that it can be compressed to form sufficiently rigid compressed elements, collectively indicated by the reference numeral 14, with each element 16 of the catalytically acting material being held to the rings 17 of the rotor 7 by the mesh pockets 15 heretofore described.

Figure 4:
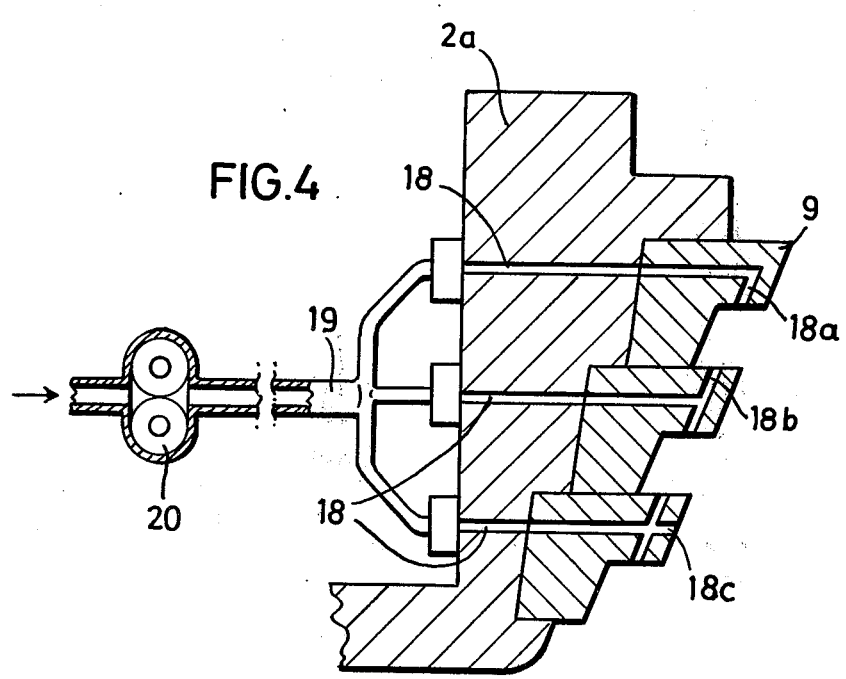
FIG. 4 is a fragmentary sectional view which illustrates the manner in which liquid or pasty catalytic material can be fed to the reaction area through teeth of a stator.

If, however, the catalytically active material is more or less of a low viscosity phase (liquid or paste) the catalyst is supplied through bores 18 (FIG. 4) of the rings 9 of the stator which bores 18 may have branch passages 18a, 18b, 18c, etc., so that the catalytically active material can be supplied in sufficient quantity to all positions in the reaction area between the rotor 7 and the stator 9. The bores 18 are preferably connected to a distributor element or manifold 19 which communicates in a suitable manner to a pump 20 by which the catalytically active material is supplied under appropriate pressure into the shearing, impact, cavitation, and/or reaction zone between the rotor and stator. Both in connection with FIGS. 1 and 4, the reactants of the product to be treated are preferably supplied through separate supply pipes 21, 22 generally axially toward a face 7a of the rotor 7.

Further details of apparatus useful in carrying out the method disclosed herein is found in our concurrently filed application entitled "Apparatus For The Catalytical Treatment Of Substances," Ser. No. 533,877.

In accordance with the claimed process, for the catalyst selected, the hydrogenation reaction proceeds at a more rapid rate. Furthermore, the catalyst has a longer useful lifetime in that it is not subjected to "gumming." In one embodiment, the catalyst selected for constructing the teeth is platinum. When the material to be hydrogenated is an edible fat or oil and the hydrogenating gas is hydrogen diluted with an inert gas such as nitrogen, the temperature is controlled at approximately 125° C. and the pressure at about 12 atm. The reaction conducted on a continuous basis proceeds rapidly and with little or no gumming of the catalyst.

As will be apparent from the foregoing, the material to be hydrogenated and/or the hydrogenating gas, as well as the catalytic material if it is introduced into the process in the form of a solid, can be carried in a solvent and/or a suspending agent. Further, the construction of the reaction apparatus can be modified, so long as the essential conditions of the process are met which are the maintenance of the shearing force upon the reaction mixture and providing the rapid succession of compressions and expansions in the presence of or when in contact with the catalyst. Furthermore, in the process the reaction chamber can be adjusted so that the mixture discharged from the reaction zone can be recycled into the reaction zone as part of the reaction feed mixture, if desired. These modifications which will be apparent to one skilled in the art in view of the aforesaid disclosure are to be covered by the appended claims.

It is claimed:

1. Process for the continuous catalytic hydrogenation of a material capable of being hydrogenated and existing in a flowable liquid form comprising feeding said flowable material together with a hydrogen-containing gas into a substantially axially symmetrical reaction zone, subjecting said material and hydrogenating gas in the presence of a hydrogenation catalyst in said reaction zone to high shearing forces and, in rapid succession, to a series of compressions and expansions, said shearing forces and rapid succession of compressions and expansions being caused by the action of circular and coaxially inter-engaging rows of teeth in said reaction zone, said rows of teeth being caused to move at a small spacing from one another.

2. The process of claim 1 wherein the material to be hydrogenated is carried in a solvent or suspending agent.

3. The process of claim 1 wherein the reaction mixture is discharged from the reaction zone, and at least in part is recycled to the reaction zone.

4. The process of claim 1 wherein the hydrogenation catalyst is premixed with the material to be hydrogenated.

5. The process of claim 1 wherein the hydrogenation catalyst is supplied continuously and separately to a reaction zone into which the material to be hydrogenated and hydrogenating gas is conducted.

6. The process of claim 1 wherein the teeth of said interengaging rows are at least in part made of a hydrogenation catalyst.

7. The process of claim 1 wherein the material to be hydrogenated is an edible fat or oil.

8. The process of claim 1 wherein the hydrogenating gas is diluted with an inert gas.

9. The process of claim 1 wherein a hydrogen-containing gas and material to be hydrogenated in admixture are fed into the reaction.

* * * * *